Feb. 24, 1970    F. F. MOBLEY ET AL    3,497,160
HYSTERESIS DAMPER
Filed Aug. 14, 1967
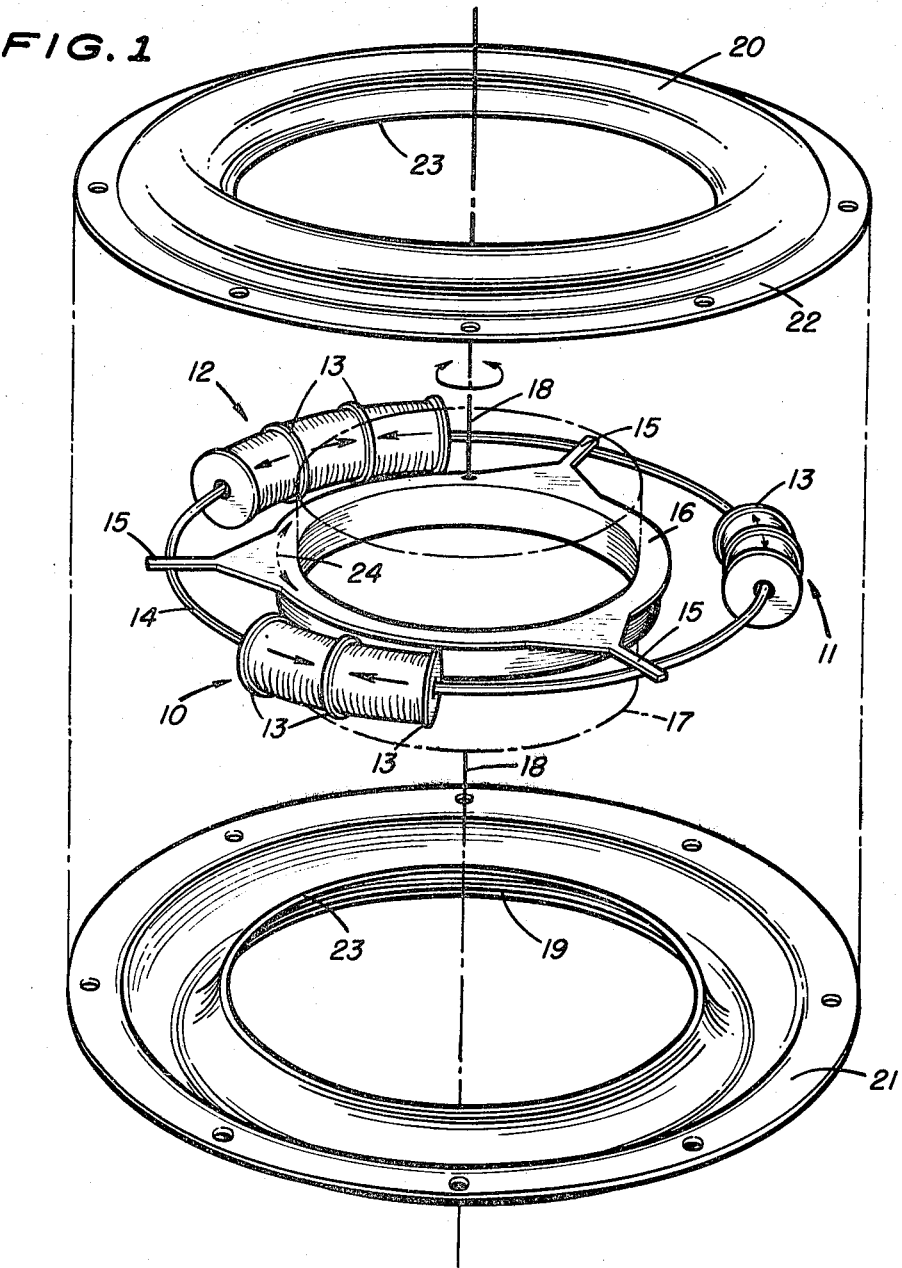
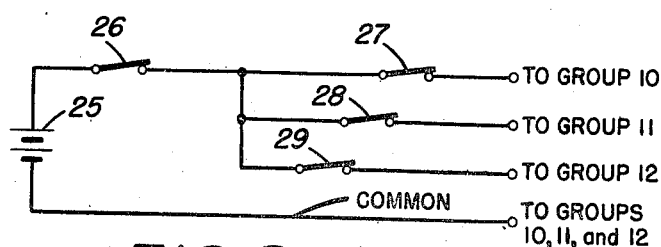
FREDERICK F. MOBLEY
BARRY E. TOSSMAN
INVENTORS

United States Patent Office 3,497,160
Patented Feb. 24, 1970

3,497,160
HYSTERESIS DAMPER
Frederick F. Mobley and Barry E. Tossman, Silver Spring, Md., assignors, by mesne assignments, to the United States of America as represented by the Secretary of the Navy
Filed Aug. 14, 1967, Ser. No. 660,838
Int. Cl. B64g 1/20
U.S. Cl. 244—1                                7 Claims

ABSTRACT OF THE DISCLOSURE

A plurality of stationary solenoid groups are spaced along the length of a movable toroid member formed of magnetic hysteresis material, with each solenoid surrounding, but not touching, the toroid. Adjacent solenoids in each solenoid group are energized to establish oppositely directed magnetic fields or interfaces within the toroid. The toroid member is adapted to be secured to a satellite damping boom so that it oscillates relative to the solenoids during satellite librations. The toroid material is thus forced to traverse its hysteresis loop at each magetic interface and the libration energy is thereby dissipated as hysteresis losses within the toroid.

BACKGROUND OF THE INVENTION

Although the present invention has application in many areas, it is particularly adapted for use in a system for stabilizing a gravity oriented earth satellite, such as is disclosed in the U.S. Patent to B. E. Tinling et al., No. 3,282,532, issued Nov. 1, 1966, wherein a plurality of pivotally mounted damper rods or booms are utilized to damp out or dissipate the oscillatory or libration energy of the satellite and thereby stabilizes it in space.

DESCRIPTION OF THE INVENTION

More specifically, the proposed hysteresis damper of the present invention represents an improved means for damping out the oscillatory motion of satellite-borne damping booms, for example, to thereby dissipate or damp out the libration energy of the satellite. The proposed hysteresis damper of the present invention is particularly adapted for such use aboard a satellite in that it possesses the capability of a plurality of different damping torque levels, selectable upon command from a ground station or the like. Moreover, it can be completely decoupled, to remove all damping torque, if desirable, by simply communicating a command to the satellite effective to simultaneously deenergize all of the solenoids employed in the proposed hysteresis damper.

Although the foregoing discussion has considered primarily the use of the proposed hysteresis damper aboard satellite or the like, it should already be obvious that the proposed device has a much broader field of application. In other words, the proposed hysteresis damper can be used wherever it is desired to dissipate the oscillatory or turning motion of a boom assembly or the like.

In view of the foregoing, one object of the present invention is to provide an improved hysteresis damper adapted to be used on an earth satellite, for example, for damping out oscillatory or turning motion of a satellite-borne boom assembly or the like.

Another object of the present invention is to provide an improved hysteresis damper structure which is capable of producing a plurality of selectable damping torque levels and which can be decoupled in a simple manner.

A still further object of the present invention is to provide an improved electromagnetic hysteresis damper structure particularly adapted for use on a satellite and being provided with a magnetic shield which effectively shields the hysteresis damper from externally generated magnetic fields, while at the same time, shielding the outside environment of the hysteresis damper from the magnetic fields produced therein.

Other objects, purposes and characteristic features of the present invention will in part be pointed out as the description of the present invention progresses and in part be obvious from the accompanying drawings wherein:

FIG. 1 is an exploded perspective view of one embodiment of the propsed hysteresis damper; and FIG. 2 is a simplified schematic diagram of one possible energizing circuit for the solenoids employed in the embodiment shown in FIG. 1.

Referring now to the embodiment of FIG. 1, the hysteresis damper of the present invention comprises a plurality of solenoid groups, designated at 10, 11 and 12 in the drawings, each containing at least two individual solenoids adapted to be energized, as will be described in more detail hereinafter, so as to produce oppositely directed magnetic fields or magnetic interfaces (designated by the short, solid line arrows in FIG. 1) adjacent thereto. More specifically, in FIG. 1, the solenoid groups 10 and 11 are illustrated as each comprising two individual solenoids; whereas, solenoid group 12 contains three solenoids. Therefore, solenoid groups 10 and 11 are each capable of generating one magnetic interface and solenoid group 12 is capable of generating two magnetic interfaces. It should be obvious that the generation of the oppositely directed magnetic fields; i.e., magnetic interfaces, at each of the solenoid groups 10, 11 and 12 can be accomplished by varying either the polarity of energization or the winding sense between adjacent solenoids. Furthrmore, it should be understood at this time that the number of individual solenoids contained in each solenoid group, as well as the number of solenoid groups, may be varied without departing from the spirit or scope of the present invention.

Suitable spacers 13, made of an insulating material such as Plexiglas, are disposed at the ends of each solenoid group and between the individual solenoids of each group, for the purpose of insulating the adjacent solenoid from one another and from the remaining damper structure, to be described hereinafter.

As shown in FIG. 1, the solenoid groups 10, 11 and 12 are disposed in spaced relationship around the length of a toroid member 14 which is constructed of suitable magnetic hysteresis material and which is free to slide back and forth through the solenoid groups, 10, 11 and 12 without contact. In practice, it has been found that one satisfactory type of material from which the toroid member 14 may be constructed is so-called Allegheny Electrical Metal, AEM 4750.

The toroidal hysteresis member 14 is affixed to the extending spokes 15 of a hub member 16, constructed of a suitable non-magnetic material such as aluminum. The hub member 16 is, in turn, adapted to be affixed to a satellite-borne boom assembly or the like, represented in dotted line form at 17 in FIG. 1. As previously mentioned, it is contemplated that the boom assembly 17 forms part of a satellite libration damping system such as that disclosed in the above-mentioned patent of B. F. Tinling et al., Patent No. 3,282,532. More specifically, when used in such a satellite damping system, the illustrated boom assembly 17 would be mounted in the satellite on a torsion wire 18, for example, and would carry one or more damping rods (not shown) which extend from the satellite and which cause the boom assembly 17 to oscillate or pivot on the torsion wire 18 when the satellite undergoes unwanted motion.

The proposed hysteresis damper structure of the present invention also includes a suitable magnetic shielding member comprising a bottom half portion 19 and top half portion 20 which are hollowed-out to receive and hold (for example, by cementing) the solenoid groups 10, 11 and 12 stationary therein. Each of the shield member halves 19 and 20 are formed with suitable flange portions 21 and 22 respectively, which are drilled to receive suitable screws or like (not shown) that hold the completed hysteresis damper structure together. The magnetic shield member 19–20 is then affixed, in any suitable manner, to the satellite. It should also be pointed out at this time that the height of the inner rim, designated at 23, of one or both of the upper and lower shield portions 20–19 is slightly less than the height of the outer rim or flange 21–22, so that when the shield member portions 19–20 are placed together, a narrow slot is formed around the inside periphery of the completed shield, through which the spokes 15 extend and slide along during oscillation of the gimbal mounted or pivoted boom assembly 17.

Preferably, the magnetic shield member 19-20 is constructed of so-called Mu Metal which provides an effective magnetic shield about the proposed hysteresis damper structure of the present invention. This magnetic shielding not only prevents the hysteresis damper from being adversely affected by magnetic fields generated externally, but, also prevents the magnetic fields produced by the solenoids in groups 10, 11 and 12 from affecting any other equipment aboard the satellite.

In operation, when the satellite experiences undesired oscillatory motion, the boom assembly 17 oscillates or turns back and forth on the torsion wire pivot 18 and thereby causes the hub member 16 to oscillate back and forth as shown by the double-headed dotted arrow 24. This, in turn, causes the toroid member 14 to slide back and forth relative to the stationary solenoid groups 10, 11 and 12. Consequently, the magnetic hysteresis material of the toroid member is forced to repeatedly undergo magnetization reversals; i.e., the magnetic hysteresis material is driven through its hyteresis loop, at each of the magnetic interfaces produced at the solenoid groups 10, 11 and 12, and thereby causes dissipation of the oscillatory energy of the boom assembly 17 as hysteresis losses within the toroid member 14. This, in turn, causes damping of the boom assembly 17 and the satellite, as is fully described in the Tinling et al. Patent, No. 3,282,532.

As mentioned previously, the proposed hysteresis damper of the present invention is capable of producing various damping torque levels, dependent upon the selective energization and deenergization of the solenoid groups 10, 11 and 12. In other words, the number of magnetic interfaces which are generated and through which the toroid member 14 is forced to move, determines the rate at which the oscillatory motion of the boom assembly 17 will be damped.

Referring now to FIG. 2, a simplified control circuit for the solenoid groups 10, 11 and 12 is illustrated, whereby the solenoid groups 10, 11 and 12 can be energized in any combination desired and also whereby all of the solenoids can be simultaneously deenergized to completely decouple the proposed hysteresis damper. More specifically, the illustrated energizing circuitry for the hysteresis damper of the present invention comprises a battery 25 or other suitable source of electrical power connected in series with a switch 26 and a plurality of parallel connected switches 27, 28 and 29. The switches 27, 28 and 29 are connected respectively to solenoid groups 10, 11 and 12 and, as mentioned previously, each of the switches 27 through 29 are adapted to be remotely controlled upon command from a ground station, whereby the solenoid groups 10, 11 and 12 can be selectively energized and deenergized, as desired, to cause the proposed hysteresis damper to produce any of a plurality of available damping torque levels. When it is desired to decouple the hysteresis damper, the switch 26 is merely commanded to its open position to thereby deenergize all of the solenoids in the groups 10, 11 and 12 simultaneously.

From the foregoing description it will be seen that the proposed hysteresis damper of the present invention is quite versatile in operation; is simple in construction; and yet, provides effective damping of the oscillatory motion of the attached boom assembly or the like. Obviously, however, many modifications and variations of the present invention are possible in the light of the above disclosure.

What is claimed is:

1. A hysteresis damper for damping the motion of a satellite-borne boom assembly or the like, comprising
  a toroid member of magnetic hysteresis material, and at least one solenoid group including at least a pair of adjacent solenoids surrounding said toroid member,
  said solenoids being adapted to be selectively energized to produce oppositely directed magnetic fields relative to which said toroid member moves due to the motion of boom assembly or the like,
  whereby the magnetic hysteresis material of said toroid member is forced to undergo a magnetization reversal as said toroid member moves relative to said oppositely directed magnetic fields and whereby the motive energy of said boom assembly or the like is dissipated as hysteresis losses within said toroid member.

2. The hysteresis damper specified in claim 1 wherein said toroid member is affixed to said boom assembly or the like so as to move therewith and said solenoids are stationary.

3. The hysteresis damper specified in claim 1 including a plurality of solenoid groups disposed in spaced relationship around the length of said toroid member and each containing at least two solenoids adapted to be selectively energized to produce oppositely directed magnetic fields relative to which said toroid member moves due to the motion of said boom assembly or the like,
  whereby the magnetic hysteresis material of said toroid member is forced to undergo at least one magnetization reversal at each solenoid group as said toroid member moves relative to said oppositely directed magnetic fields and whereby the motive energy of said boom assembly or the like is dissipated as hysteresis losses within said toroid member.

4. The hyteresis damper specified in claim 3 further including circuit means for selectively energizing and deenergizing said solenoid groups, whereby a plurality of different damping torque levels are available.

5. The hysteresis damper specified in claim 4 wherein said circuit means is furthermore adapted to simultaneously deenergize all of said solenoids so as to decouple said hysteresis damper.

6. The hysteresis damper specified in claim 1 further including a shield member surrounding said solenoids for magnetically shielding said hysteresis damper.

7. The hysteresis damper specified in claim 2 wherein said boom assembly is pivotally mounted on said satellite by a torsion wire about which said boom assembly oscillates during undesirable motion of said satellite and further including a non-magnetic hub member affixed to said boom assembly and having a plurality of extending spokes, said toroid member being affixed to said spokes such that said toroid member oscillates with said boom assembly and thereby moves back and forth through the oppositely directed magnetic fields produced by said solenoids.

References Cited

UNITED STATES PATENTS

| | | | |
|---|---|---|---|
| 492,773 | 3/1893 | Ayres | 310—93 |
| 2,519,882 | 8/1950 | Bullard et al. | 310—93 |
| 3,282,532 | 11/1966 | Tinling et al. | 244—1 |

FERGUS S. MIDDLETON, Primary Examiner

U.S. Cl. X.R.

310—93